United States Patent
Huang et al.

(10) Patent No.: US 7,139,110 B2
(45) Date of Patent: Nov. 21, 2006

(54) MICRO-STRUCTURE GAP CONTROL TECHNOLOGY AND STRUCTURE FORMED THEREFROM

(75) Inventors: Long-Sun Huang, Taipei (TW); Yang-Lin Chen, Taipei (TW)

(73) Assignee: Walsin Lihwa Corp., Taipei (TW)

( * ) Notice: Subject to any disclaimer, the term of this patent is extended or adjusted under 35 U.S.C. 154(b) by 0 days.

(21) Appl. No.: 10/864,182

(22) Filed: Jun. 9, 2004

(65) Prior Publication Data
US 2005/0035419 A1    Feb. 17, 2005

(30) Foreign Application Priority Data
Jun. 9, 2003    (TW)    ............................. 92115600 A

(51) Int. Cl.
    G02B 26/00    (2006.01)
(52) U.S. Cl. ........................................ 359/290; 359/291
(58) Field of Classification Search ............... 359/290, 359/291, 292, 245, 248, 224, 223, 260
See application file for complete search history.

(56) References Cited

U.S. PATENT DOCUMENTS

| | | | |
|---|---|---|---|
| 6,356,689 B1 * | 3/2002 | Greywall | .................. 385/52 |
| 6,791,742 B1 * | 9/2004 | Staker et al. | ............... 359/291 |
| 6,813,054 B1 * | 11/2004 | Aksyuk et al. | ............. 359/224 |

\* cited by examiner

*Primary Examiner*—Hung Dang
*Assistant Examiner*—Tuyen Tra
(74) *Attorney, Agent, or Firm*—Volpe And Koenig, P.C.

(57) ABSTRACT

A grating manufactured by a micro-structure gap control technique is provided in this invention. The grating includes a first structural part, a second structural part and a substrate. The first structural part includes a first micro-structure and a concavity, the second structural part includes a second micro-structure and an island structure located within the concavity, wherein a gap exists between the inland structure and the concavity. Further, the substrate is bonded to the first structural part and the second structural part for supporting the first structural part and the second structural part.

13 Claims, 4 Drawing Sheets

MICRO-STRUCTURE GAP CONTROL TECHNOLOGY AND STRUCTURE FORMED THEREFROM

FIELD OF THE INVENTION

This invention relates to a method for manufacturing a grating, and especially to one method used to manufacture a micro actuated blazed grating.

BACKGROUND OF THE INVENTION

Micro Electro-Mechanical System (MEMS) is called Micro-System-Technology in Europe. MEMS is started in combining the semiconductor manufacturing process with the precisely mechanical technology for researching and developing the micro bio-mechanical photoelectric element and the micro system with integrated function. The MEMS is a tiny system with the ability of performing a predetermined action, and its size has become more compact with the improvements of science and technology. A compact system has lots of advantages, such as space-saved, material-saved, low-pollution, and energy-saved. Further, once the relevant technology matures, it would be possible to manufacture the compact system on a large scale economically.

Nowadays, the MEMS is a growing trend for the whole world, but the relevant definitions are not quite the same between different areas, for example it is generally called Micro-System-Technology in Europe but called Micro-Machines in Japan. A general definition of the MEMS is an intelligent tiny system with the capabilities of sensing, processing, actuating and so on. MEMS integrates the properties of electronics, mechanism, optics, chemistry, biology, magnetics or other sciences into a signal or more chips. In the U.S., the MEMS means an integrated micro element or an integrated micro system which includes the electronic and mechanical elements produced by the integrated circuit (IC) compatibility batch processing technology. Further, the size thereof is in the micrometer level to the millimeter level.

In Taiwan, the definition of MEMS includes the definitions of U.S., Europe, and Japan, and it is usually called MEMS technology. The relevant technologies included therein are silicon-based technologies, the LIGA technology, that means the "lithograpie galvanoformung abformung" in German and the lithography electroforming micro molding in English, and other traditional technologies. The LIGA technology includes the technologies of photoetching, electroforming, molding and so on, and can be divided into two parts of laser LIGA and X-ray LIGA. The MEMS is used to manufacture micro sensors, signal processors, micro actuators and so on by applying the system technology, the micro technology, and the material effect technology. The MEMS can be used in various industries, such as the manufacturing industry, the automation industry, the information and transmission industries, the aerospace industry, the traffic transportation industry, the construction industry, the environmental-protection industry, agriculture, the medical equipment industry and so on.

A general MEMS includes a micro sensor, a micro actuator and an integrated circuit, and its main feature is being compact. A compact size makes the MEMS to have some advantages such as being capable to be used in the structure with high precision and high stability, being capable to manufacture lots of identical elements into a tiny area, and being capable of manufacturing the products in batches for saving money and increasing the production efficiency. To sum up the above, the advantages of the MEMS are space-saving, money-saving, highly competitive due to its compact size.

Three main semiconductor manufacturing processes are the thin film growing, the photolithography, and the etching. However, the MEMS manufacturing process is based on and extended from the present semiconductor manufacturing processes. Further, the manufacturing process of MEMS is more flexible and variable than that of a general IC. For example, the MEMS manufacturing process includes the thin film growing, the photolithography, the wet etching, the dry etching, the anisotropic etching, the electroform, the silicon micromachining, and so on. In which, the silicon micromachining includes the bulk micromachining, the surface micromachining, and the LIGA technology.

1. Bulk micromachining: A bulk micromachining is a processing technology that uses a silicon chip as the base material for etching and segmenting. Since the commonly used materials are silicon chips and glasses, the micromachining process has some limitations, i.e. it has a bonding temperature limitation during a doping process therein, and it has an electric field limitation for a base material having electric circuits located thereon. In addition, it is common to accelerate the micromachining and increase the boding strength by increasing the processing temperature. However, since the expanding factors of various materials are different from each other, once the processing temperature cools down, a thermal stress occurs between the materials and leads to some breakages. In the other words the yields of the manufactured elements will be reduced. In addition, since some elements are specific in purpose use, they have the limitations about the base materials. For example, an insulating material, such as a glass, is essential for manufacturing an electrophoresis chip. Furthermore, the bulk micromachining usually includes an etching process, preferably a wet etching. The chip for bulk micromachining usually has a size from several millimeters to micrometers and the etching depths into the chip are from millimeters to micrometers.

2. Surface micromachining: A surface micromachining is similar to the traditional IC semiconductor manufacturing process. In tradition, a semiconductor component is formed by stacking multiple thin layers together via the processes of evaporation, sputtering or chemical deposition. Since every micromechanical structure of the component is formed by depositing thin films, the precision and the resolution of the component manufactured by the surface micromachining are better than those manufactured by the bulk micromachining. Therefore, while processing a one-chip circuit, a microstructure or a micro sensor, the surface micromachining is more advantageous than the bulk micromachining. However, for manufacturing a MEMS component, the two micromachinings are incomparable with each other, since it depends on the desirous property and the function of the component.

3. LIGA process: The LIGA process is a technology from Germany and its original text is "lithographic galvanoformung abformung", which is called as LIGA for short. The LIGA process includes the technologies related to the optics, electroplating, and modeling. The LIGA process is an optical etching mainly using an X-ray as its light source. During the LIGA process, some patterned masks or photoresist (for example, the polymethyl methacrylate PMMA) are used to selectively covers some surfaces of the substrate, and then the exposed parts are etched by various light. After etched, the substrate is electroformed and processed with an injection-modeling so as to form the desirous product. Further, the application fields of the LIGA process are wider than those of bulk micromachining and surface micromachining.

In addition, since the MEMS also includes the micro-manufacturing technology, the bonding technology, the packaging technology, and the checking technology, the MEMS is also called micro-system basic technology.

In the past, during the process of manufacturing an element via the traditional bulk micromachining of the MEMS, different parts of the element are made from different silicon chips. After manufactured, the different parts are combined together and formed the element via a micro-assembling technology. That is to say the MEMS element is formed from different components manufactured independently. However, since the thicknesses of the different silicon chips are different from each other, to assemble them is quite difficult. In order to solve the above problem, it is desirable to manufacture the different parts of an element from a single one silicon chip is desirable. In addition, to manufacture an element via a MEMS surface micromachining is limited by the thicknesses of the deposition materials and the internal stresses formed during the deposition process, so that it is difficult to manufacture an element with wide area, high flatness, and great displacement via a MEMS surface micromachining. Therefore, it is also desirable to manufacture an element via a MEMS bulk micromachining.

SUMMARY OF THE INVENTION

It is an object of the present invention to provide a structure manufactured by a micro-structure gap control technique. The structure includes a first structural part having a first micro-structure and a concavity, a second structural part having a second micro-structure and an island structure located within the concavity, and a substrate bonded to the first structural part and the second structural part for supporting the first structural part and the second structural part. In which, a gap exists between the inland structure and the concavity.

Preferably, the first micro-structure and the second micro-structure are micro-electromechanical system (MEMS) micro-structures.

Preferably, the first micro-structure and the second micro-structure include a micro-control gap.

Preferably, the first micro-structure and the second micro-structure are manufactured by an anisotropic wet etching method.

Preferably, an etching solution used in the anisotropic wet etching method is a potassium hydroxide solution.

Preferably, the first micro-structure further includes a first electrode layer, a first etch resist, a sounding opening and a suspending structure.

Preferably, the second micro-structure further includes a second electrode layer, and a second etch resist.

Preferably, each of the first electrode layer and the second electrode layer includes an adhesive layer and a metal.

Preferably, each of the first etch resist and the second resist includes a silicon dioxide layer and a silicon nitride layer.

Preferably, the first structural part is connected to the second structural part by an anodic bonding.

Preferably, the first structural part and the second structural part are array structures.

Preferably, the island structure is one selected from a group consisting of a square stereoisland structure, a multilateral stereoisland structure, and a spherical stereoisland structure.

Preferably, the concavity is one selected from a group consisting of a square concavity, a multilateral concavity, and a spherical concavity.

It is another object of the present invention to provide a method for manufacturing a micro-structure. The method includes steps of: a) manufacturing a first structural part and a second structural part from a chip; b) forming a concavity on the first structural part; c) forming an island structure on the second structural part; d) bonding the second structural part to a substrate; and e) bonding the substrate to the first structural part.

Preferably, the first structural part and the second structural part are simultaneously manufactured through a mask.

Preferably, the step a) further includes steps of: a1) forming a first etch resist on a first side of the first structural part and a second etch resist on a second side of the first structural part; a2) forming a third etch resist on a first side of the second structural part and a fourth etch resist on a second side of the second structural part; and a3) separating the first structural part from the second structural part by an etching solution of potassium hydroxide.

Preferably, the second side of the first structural part further comprises a first opening area formed by a lithography.

Preferably, the step b) further includes steps of: b1) forming a first electrode layer on the first side of the first structural part; b2) forming a sounding opening on the first side of the first structural part by etching; b3) forming an actuator area adjacent to the sounding opening by etching the first structural part; and b4) forming a suspending structure by etching a position of the first structural according to the actuator area.

Preferably, the suspending structure has a position located corresponding to the island structure after the step e).

Preferably, the step c) further includes steps of: c1) forming a second electrode layer on the first side of the second structural part; c2) forming a second opening area on the first side of the second structural part by etching; and c3) reducing a thickness of the second structural part to a desired thickness by etching.

Preferably, the step e) is performed by an anodic bonding.

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
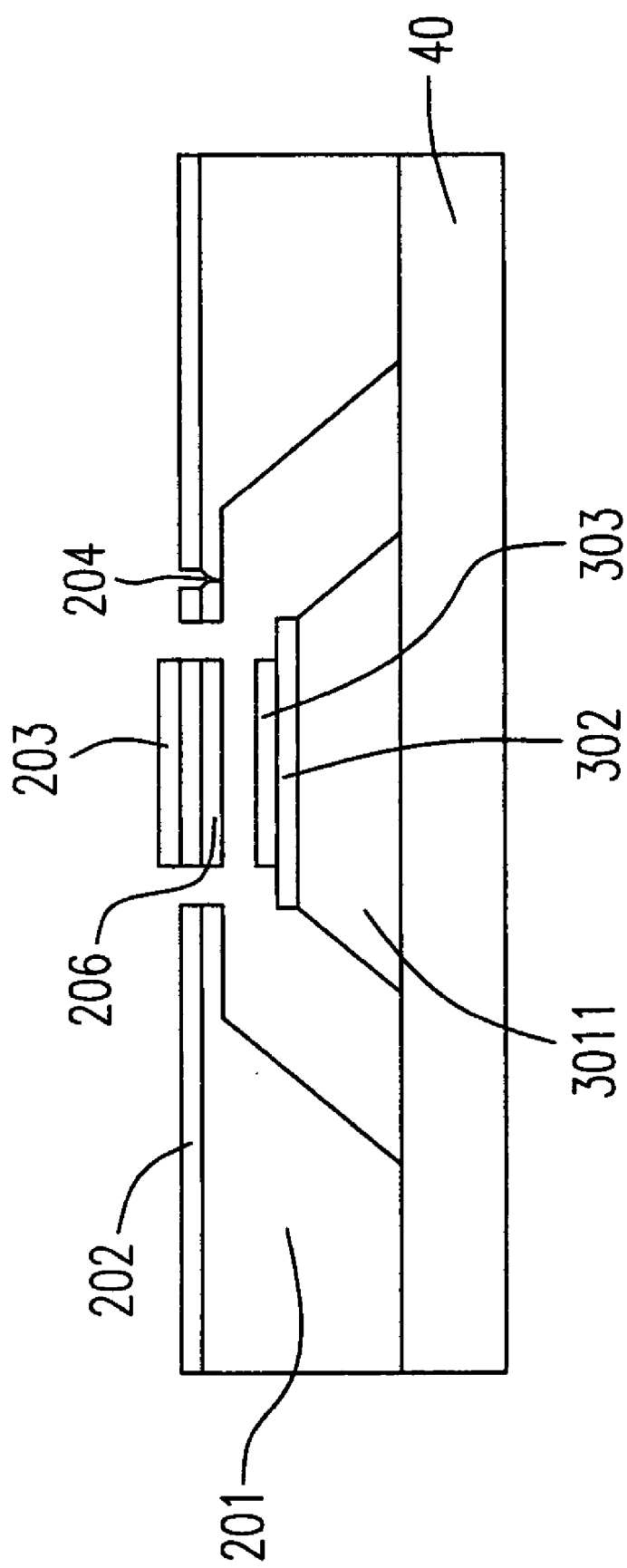
FIG. 1 is a schematic diagram of a micro structure manufactured by a micro-structure gap control technique including a silicon anisotropic wet etching method and an anodic bonding method according to a preferred embodiment of the present invention.

Please refer to FIG. 1, which is a schematic diagram of the micro grating manufactured by a micro-structure gap control technique including a silicon anisotropic wet etching method and an anodic bonding method according to a preferred embodiment of the present invention. As shown in FIG. 1, the micro grating includes the glass substrate 40, the first silicon substrate 201, the lower silicon substrate 3011, the first etch resist 202, the second etch resist 302, the sounding opening 204, the lower electrode conductive layer 303, the suspending structure 206, and the upper electrode conductive layer 203. The first silicon substrate 201 is bonded to the glass substrate 40 by anodic bonding, and the lower silicon substrate 3011 is bonded to the glass substrate 40 by an etching and an anodic bonding. In addition, the first etch resist 202 is formed on the first silicon substrate 201 to be served as a resist mask when the first silicon substrate 201 is etched by the etching solution of the potassium hydroxide. The first etch resist 202 is formed by depositing a silicon dioxide layer with a furnace first, and then depositing a silicon nitride layer onto the silicon dioxide via a low pressure chemical vapor deposition system.

Further, the sounding opening 204 is used to measure the remained thickness of the first silicon substrate 201 after the silicon substrate 201 is processed by anisotropic wet etching. In addition, the second etch resist 302 is formed on the lower silicon substrate 3011 to be served as a resist mask when the lower silicon substrate 3011 is etched by the etching solution of the potassium hydroxide. The second etch resist 302 is also formed by depositing a silicon dioxide layer with a furnace first and then depositing a silicon nitride layer onto the silicon dioxide via a low pressure chemical vapor deposition system.

The lower electrode conductive layer 303 is formed by coating a chromium layer onto the lower silicon substrate 3011 as an adhesive layer first, and then coating an aurum layer onto the chromium layer, in which the aurum layer is used as an inductive layer. Similarly, the upper electrode 203 is formed by coating a chromium layer onto the first etch resist 202 as an adhesive layer first and then coating an aurum layer onto the chromium layer, in which the aurum layer is used as an inductive layer. The suspending structure 206 is a silicon structure. And, the space formed between the lower electrode 303 and the suspending structure 206 is the gap created according to the present invention.

Figure 2:
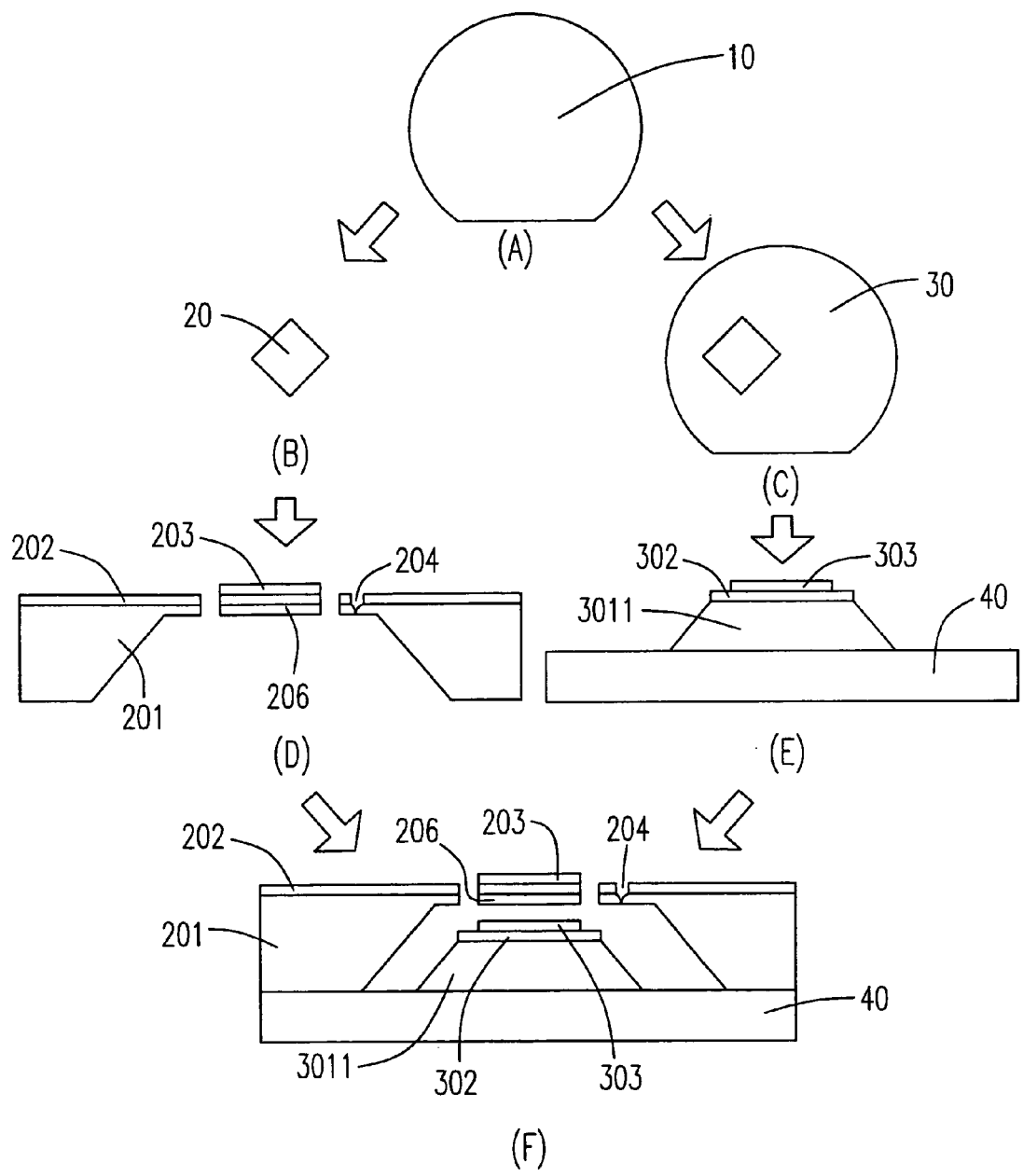
FIGS. 2 (A)–(F) show a flow chart of the micro-structure gap control technique with a silicon anisotropic wet etching method and an anodic bonding method according to a preferred embodiment of the present invention.

In order to specify a concept of the present invention, a schematic flow chart of the micro-structure gap control technique according to a preferred embodiment of the present invention is shown in FIG. 2. As shown in FIG. 2 (A), a silicon substrate 10 is provided first. After processed by a MEMS bulk micromachining process, the silicon substrate 10 is divided into two parts 20, 30, as shown in FIGS. 2 (B) and 2 (C). Then, an upper electrode and a lower electrode are respectively formed from the two parts 20, 30, as shown in FIGS. 2 (D) and 2 (E). In which, the formed upper electrode includes the first silicon substrate 201, the first etch resist 202, the upper electrode conductive layer 203, the sounding opening 204, and the suspending structure 206. And, the formed lower electrode includes the glass substrate 40, the lower silicon substrate 3011, the second etch resist 302, and the lower electrode conductive layer 303. Finally, the formed upper electrode is assembled to the lower electrode by an anodic bonding so as to form the micro grating with a gap of the present invention, as shown in FIG. 2 (F).

Figure 3:
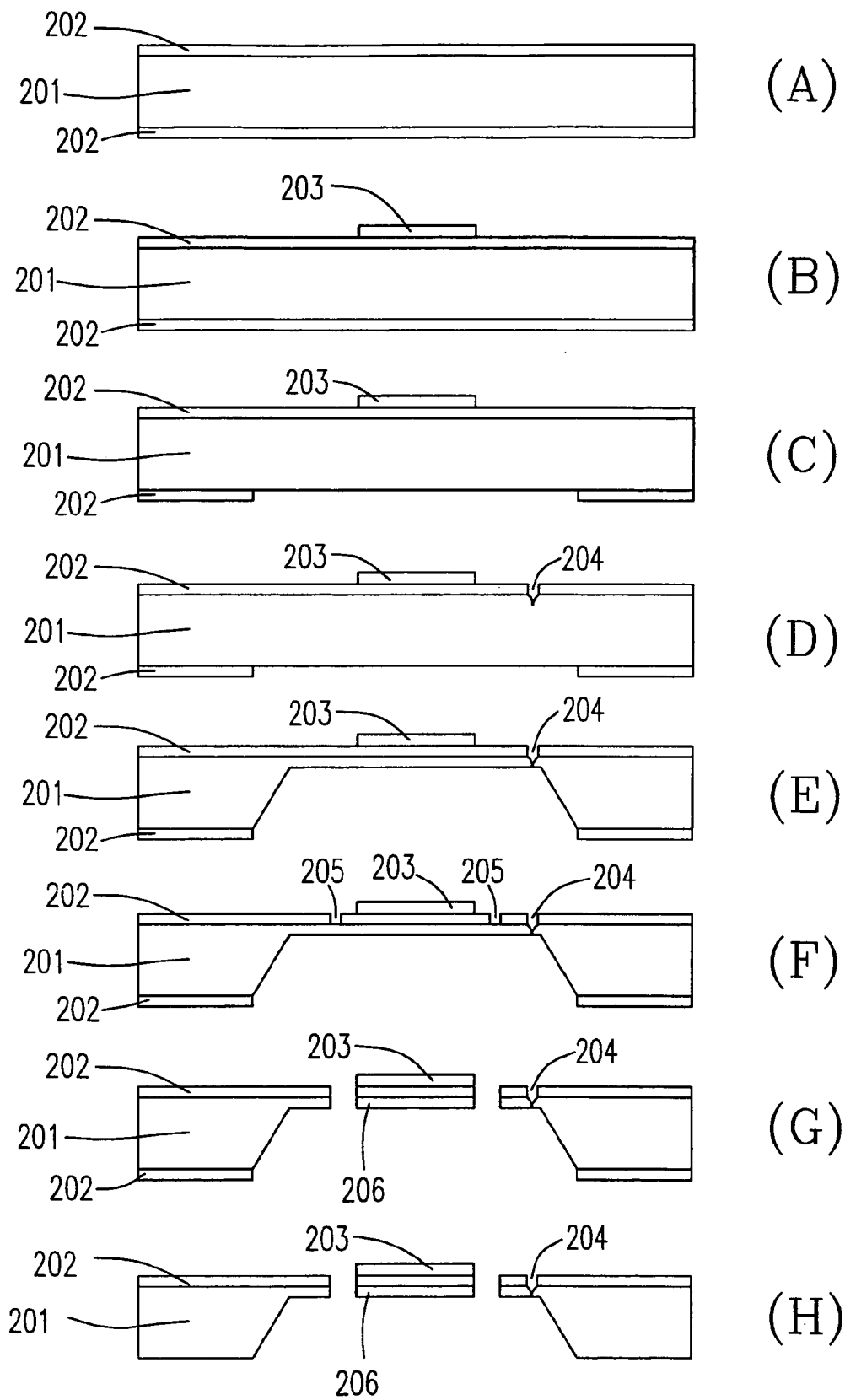
FIGS. 3 (A)–(H) show a flow chart of manufacturing an upper electrode via the micro-structure gap control technique including an anisotropic wet etching method and an anodic bonding method according to a preferred embodiment of the present invention.

For further specifying the manufacturing process of the upper electrode, a schematic flow chart of manufacturing the upper electrode according to the preferred embodiment of the present invention is shown in FIG. 3. First, the first etch resists 202 are formed on the upper and lower surfaces of the first silicon substrate 201 respectively via depositing a silicon dioxide layer with a furnace first and then depositing a silicon nitride layer onto the silicon dioxide via a low pressure chemical vapor deposition system, as shown in FIG. 3 (A). Secondly, the upper electrode conductive layer 203 including a chromium layer and an aurum layer is coated onto the first etch resist 202 located on the upper surface of the first silicon substrate 201 via an evaporator (not shown), and meanwhile the upper electrode area is defined accordingly, as shown in FIG. 3 (B). Thirdly, some parts of the first etch resist 202 located on the lower surface of the first silicon substrate 201 are removed by an active ion etching, as shown in FIG. 3 (C). Fourthly, the sounding opening 204 is formed, as shown in FIG. 3 (D). In which, the site of the sounding opening 204 is defined by an optical etching with a mask, and the first etch resist 202 located within the defined site is removed by an active ion etching. Fifthly, the first silicon substrate 201 is etched by the potassium hydroxide solution from its lower surface, where is not covered by the first etch resist 202, and the result is shown in FIG. 3 (E). In which, the sounding opening 204 is used to evaluate the etching depth of the first silicon substrate 201. Sixthly, the openings 205 are formed after defining the their positions with a lithography and removing the first etch resist 202 via an active ion etching, and then the outline of the actuator is defined, as shown in FIG. 3 (F). In which, the defined outline of the actuator is necessarily larger than that of the upper electrode area for being as the etching compensation zone. Seventhly, the first silicon substrate 201 is etched by a potassium hydroxide solution through the openings 205, and the structure composed of the upper electrode conductive layer 203, the suspending structure 206, and the first etch resist 202 located between the upper electrode conductive layer 203 and the suspending structure 206 is released to be suspended, as shown in FIG. 3 (G). Then, the first etch resist 202 located on the lower surface of the first silicon substrate 201 is etched by an active ion etching, as shown in FIG. 3 (H). Accordingly, the upper electrode is obtained.

Figure 4:
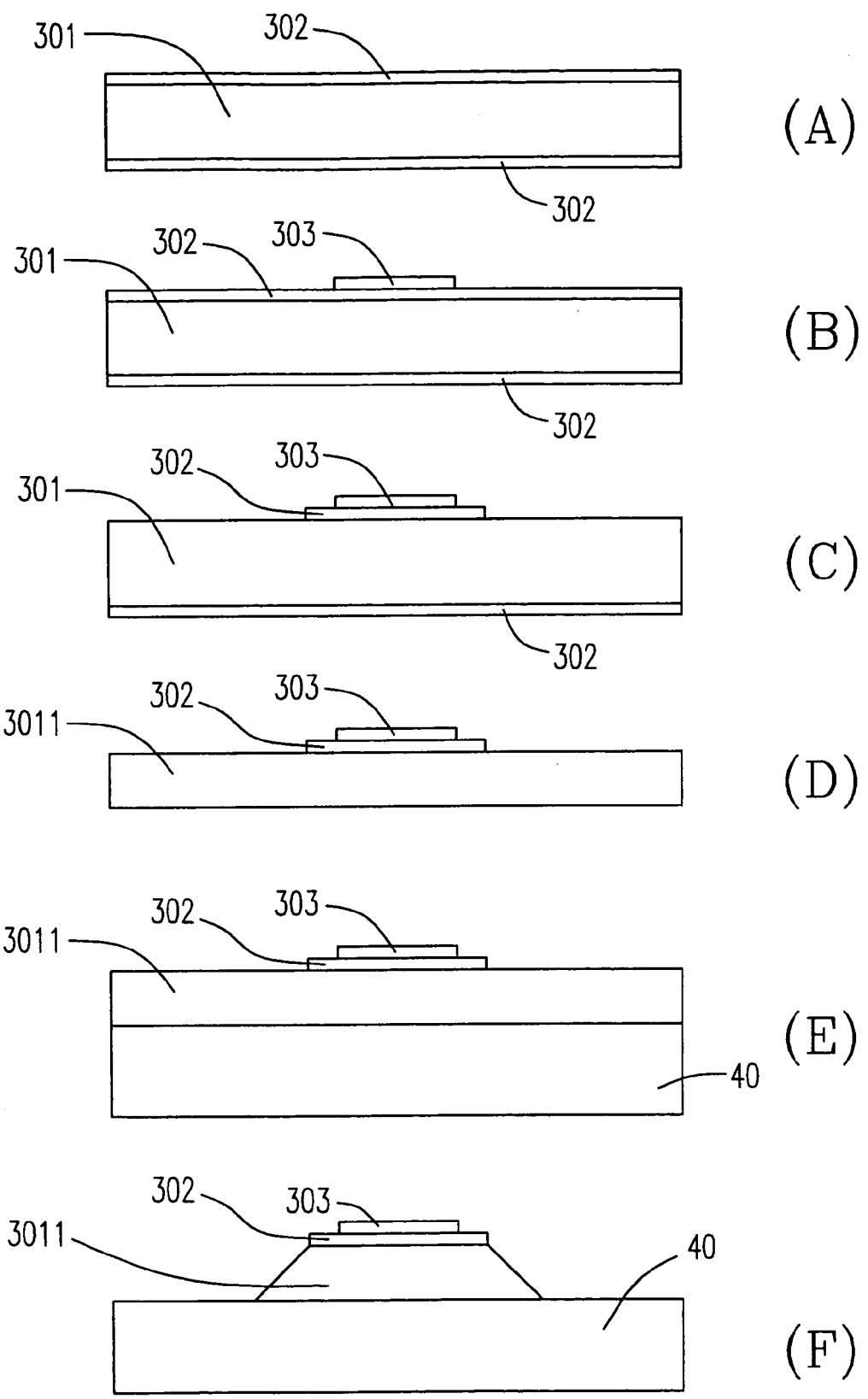
FIGS. 4 (A)–(F) show a flow chart of manufacturing a lower electrode via the micro-structure gap control technique including an anisotropic wet etching method and an anodic bonding method according to a preferred embodiment of the present invention.

On the other hand, a schematic flow chart of manufacturing the lower electrode according to the preferred embodiment of the present invention is shown in FIG. 4. First, the second etch resists 302 are formed on the upper and lower surfaces of the second silicon substrate 301 respectively via depositing a silicon dioxide layer with a furnace first and then depositing a silicon nitride layer onto the silicon dioxide via a low pressure chemical vapor deposition system, as shown in FIG. 4 (A). Secondly, the upper electrode conductive layer 303 including a chromium layer and an aurum layer is coated onto the second etch resist 302 located on the upper surface of the second silicon substrate 301 via an evaporator (not shown), and meanwhile the lower electrode area is defined accordingly, as shown in FIG. 4 (B). Thirdly, some parts of the second etch resist 302 located on the upper surface of the second silicon substrate 301 are removed by active ion etching, as shown in FIG. 4 (C). Fourthly, the second etch resist 302 located on the lower surface of the second silicon substrate 301 is removed by active ion etching, and then the lower silicon substrate 3011 is formed by etching the second silicon substrate 301 from its lower surface by an potassium hydroxide solution or an active ion etching, as shown in FIG. 4 (D). In which, the etched thickness of the second silicon substrate 301 is determined by the sum of the height difference between the lower electrode conductive layer 303 and the suspending structure 206, the thickness of the second etch resist 302 located on the upper surface of the second silicon substrate 301, and the thickness of the lower electrode conductive layer 303, referring to FIG. 2. Fifthly, the lower silicon substrate 3011 is bonded to the glass substrate 40 by an anodic bonding, as shown in FIG. 4 (E). Then, the lower silicon substrate 3011 is etched by the potassium hydroxide solution to form an island structure, as shown in FIG. 4 (F). The lower electrode is obtained accordingly.

Please refer to FIGS. 3 (A)–(F) and 4 (A)–(C), it should be noted that the above upper electrode and lower electrode are formed from the same silicon substrate 10, and the relevant manufacturing processes are carried out simultaneously. Furthermore, it should be also noted that the mask used for the manufacturing processes of FIG. 3 (B) is the same as that for the manufacturing processes of FIG. 4 (B), and the mask used for the manufacturing processes of FIG. 3 (F) is the same as that for the manufacturing processes of FIG. 4 (C).

As mentioned above, the present invention provides a new technology which includes the MEMS system technologies and the relevant assembling technologies and is able to manufacture an element having a precise gap between its upper structure part and lower structural part under a precise controlling. In addition, since the inventive technology is a simpler manufacturing process, an integrated manufacturing process, and has the advantages of the MEMS bulk micromachining technology, such as the high flatness and the great displacements, the inventive technology has the progressiveness, the novelty, and the utility for the industries.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A structure manufactured by a micro-structure gap control technique, comprising:
   a first structural part comprising a concavity and a first micro structure having a sounding opening;
   a second structural part comprising a second micro-structure and an island structure located within said concavity, wherein a gap exists between said island structure and said concavity; and
   a substrate bonded to said first structural part and said second structural part for supporting said first structural part and said second structural part.

2. The structure as claimed in claim 1, wherein said first micro-structure and said second micro-structure are micro-electromechanical system (MEMS) micro-structures.

3. The structure as claimed in claim 2, wherein said first micro-structure and said second micro-structure comprise a micro-control gap.

4. The structure as claimed in claim 1, wherein said first micro-structure and said second micro-structure are manufactured by an anisotropic wet etching method.

5. The structure as claimed in claim 4, wherein an etching solution used in said anisotropic wet etching method is a potassium hydroxide solution.

6. The structure as claimed in claim 1, wherein said first micro-structure further comprises a first electrode layer, a first etch resist, and a suspending structure.

7. The structure as claimed in claim 6, wherein said second micro-structure further comprises a second electrode layer, and a second etch resist.

8. The structure as claimed in claim 7, wherein each of said first electrode layer and said second electrode layer comprises an adhesive layer and a metal.

9. The structure as claimed in claim 7, wherein each of said first etch resist and said second resist comprises a silicon dioxide layer and a silicon nitride layer.

10. The structure as claimed in claim 1, wherein said first structural part is connected to said second structural part by an anodic bonding.

11. The structure as claimed in claim 1, wherein said first structural part and said second structural part are array structures.

12. The structure as claimed in claim 1, wherein said island structure is one selected from a group consisting of a square stereoisland structure, a multilateral stereoisland structure, and a spherical stereoisland structure.

13. The structure as claimed in claim 1, wherein said concavity is one selected from a group consisting of a square concavity, a multilateral concavity, and a spherical concavity.

* * * * *